Patented May 1, 1934

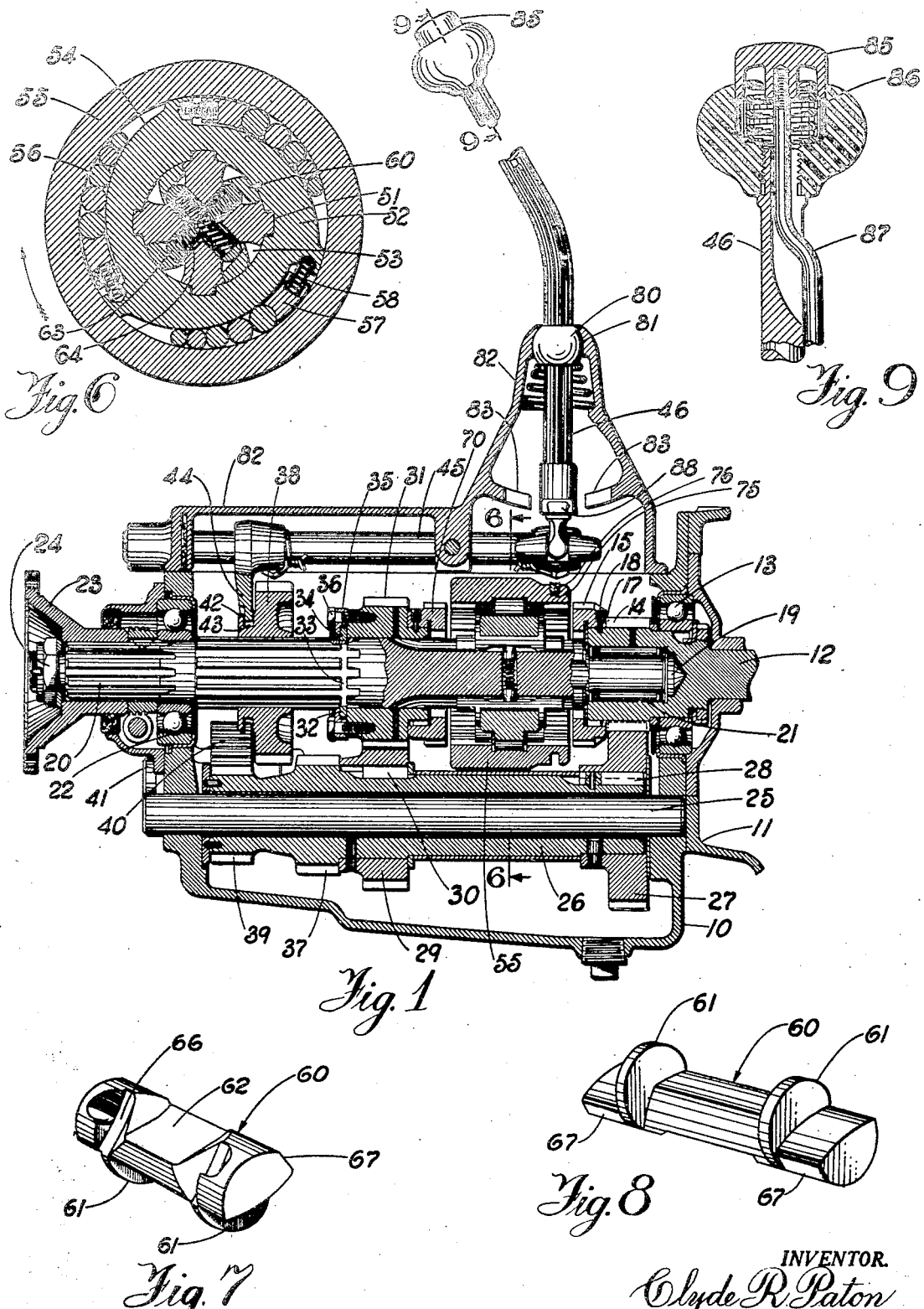

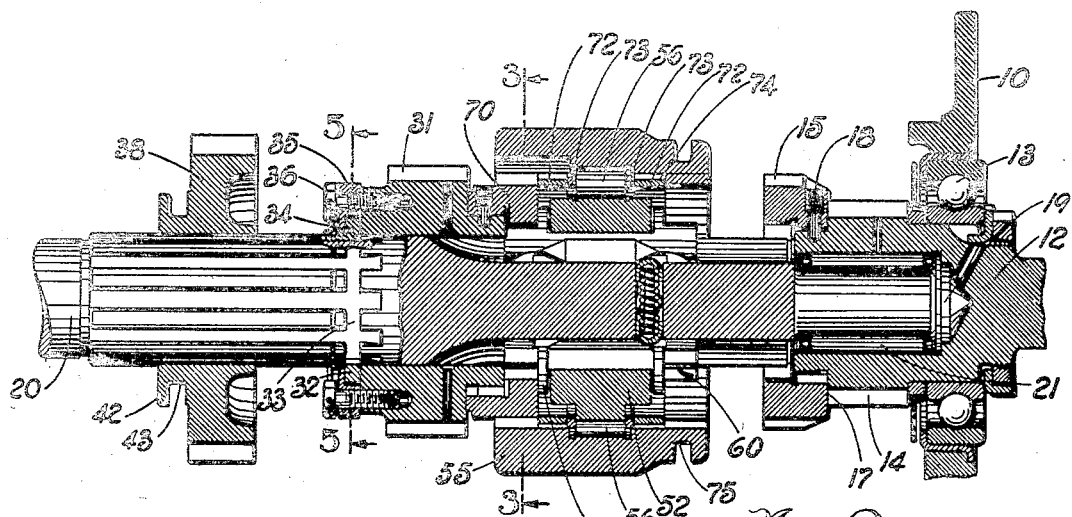
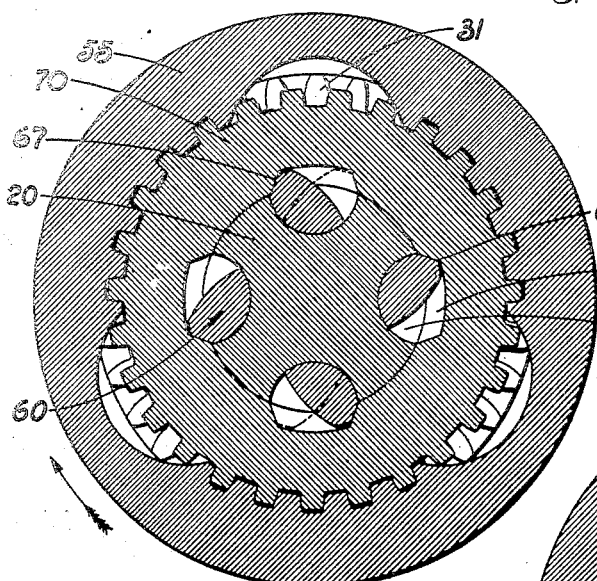
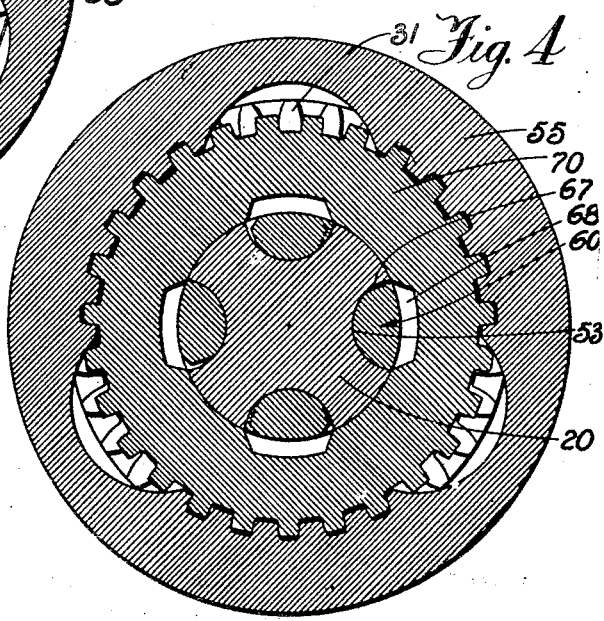
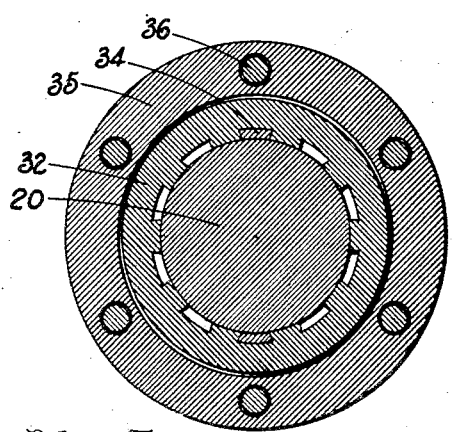

1,956,995

UNITED STATES PATENT OFFICE

1,956,995

FREE WHEELING TRANSMISSION DEVICE

Clyde R. Paton, Birmingham, Mich., assignor, by mesne assignments, to Free Wheeling Patents Corporation, South Bend, Ind., a corporation of Delaware Application October 24, 1930, Serial No. 490,912

14 Claims. (Cl. 192—48)

This invention relates to free wheeling transmission devices for motor vehicles and particularly to transmission devices for driving the driven shaft from the drive shaft at a plurality of forward speeds and for permitting overrun of the driven shaft relative the drive shaft under the control of the operator.

The principal object of the invention is to provide a transmission device operatively connected with the speed change gears which will permit or prevent, under the control of the operator, the driven shaft to rotate freely under its momentum in the forward movement of the vehicle at a greater rate of speed than the speed of rotation of the driving medium.

Another object is to provide a transmission mechanism having means therein to permit free wheeling of the vehicle in a forward direction relative to the engine driving means and rotatable means, under the control of the operator, to prevent free wheeling.

Another object is to provide an overrunning clutch mounted on the transmission shaft to permit free wheeling of the vehicle in a forward direction relative to the engine driving means, and rotatable keys on the transmission shaft, operable under the control of the operator, to engage with the change speed gears to prevent free wheeling, when desired.

Another object is to provide a multiple speed transmission having a main shaft, an overrunning clutch mounted on said shaft between the engine driving means and the reversing mechanism for permitting free wheeling of the vehicle in a forward direction relative to the engine driving means, and rotatable keys operable under the control of the operator to engage with the change speed gears to prevent free wheeling, when desired.

Further objects and objects relating to details of construction and methods of manufacture will be apparent from the detailed description to follow.

Referring to the accompanying drawings which show one suitable embodiment of my invention, Figure 1 is a longitudinal sectional view through a transmission mechanism having my invention embodied therein, certain parts being shown in full lines to better illustrate the invention.

Figure 2 is an enlarged fragmentary longitudinal sectional view taken on the same line as Figure 1 showing the free wheeling mechanism engaged with the gear operable to provide "second" speed and the rotatable keys in locked position therewith.

Figure 3 is an enlarged transverse sectional view taken on the line 3—3 of Figure 2, showing the rotatable keys engaged with the "second" speed gear.

Figure 4 is a view similar to Figure 3, showing the rotatable keys rotated to unlocked position.

Figure 5 is an enlarged transverse sectional view taken on the line 5—5 of Figure 2, showing the thrust collar for preventing longitudinal movement of the "second" speed gear on the transmission shaft.

Figure 6 is a transverse sectional view taken on the line 6—6 of Figure 1, showing the overrunning clutch mechanism.

Figure 7 is a perspective view of one of the rotatable keys, showing the face engageable with the transmission shaft.

Figure 8 is another perspective view of the key showing the same in a different position.

Figure 9 is an enlarged sectional view taken on the line 9—9 of Figure 1, showing the gear shifting operating handle.

Referring to the accompanying drawings in which like numerals refer to like parts throughout the several different views, I have illustrated a transmission casing 10 secured in any suitable manner to the clutch housing 11 forming a part of a driving medium such as an internal combustion engine, not shown. The clutch shaft 12 which may be driven from the crank shaft (not shown) and hereinafter referred to as the driving shaft, extends through the forward face of the transmission casing 10 and is supported to rotate therein by any suitable means such as ball bearings indicated generally by the numeral 13. The outer end of the clutch shaft 12 terminates in a gear 14 provided with external teeth and is also provided with a clutch member 15 also having external teeth illustrated as having a larger diameter than the gear 14. The gear 14 is integral with the shaft 12 and the clutch member 15 is secured thereto against longitudinal and rotational movement. The clutch member 15 is also formed with internal teeth adapted to mesh with the teeth on the gear 14 for taking the radial thrust, and the axial thrust is overcome by the clutch member 15 abutting against the shoulder 17 on the shaft 12, as is clearly shown in Figure 2. A pin 18 extending through the clutch member 15 and into the shaft 12 also maintains the clutch member in fixed position relative to the shaft 12 as will be readily apparent.

The shaft 12 has a recess 19 in its outer end in which an end of the main transmission shaft 20 is mounted, the latter being journaled in the roller bearings 21 as is clearly shown in Figures 1 and 2. The rear end of the transmission shaft 20 is supported in a suitable bearing 22 located in the rear end face of the transmission casing 10. I have illustrated this bearing as being of a conventional ball design but it will be understood that any bearing suitable for the purpose described may be substituted without departing from the spirit and scope of my invention. A flanged member 23 forming a part of a universal joint connecting the transmission shaft with the driven or propeller shaft (not shown) is splined on the rear end of the transmission shaft 20 and is held thereon against longitudinal movement by the nut 24.

A countershaft 25 positioned beneath the main transmission shaft 20 is fixed at its ends in the transmission casing 10 as is clearly shown in Figure 1. A sleeve 26 freely rotatable on the countershaft 25 has a gear 27 secured thereon as by the key 28, said gear being adapted to mesh with the gear 14 on the driving shaft 12 and rotate therewith. A second gear 29 is also secured, as by a key 30, on the sleeve 26 in spaced relation to the gear 27 in meshing engagement with a gear 31 rotatably mounted on the transmission shaft 20. As just stated, the gear 31 is free to rotate on the transmission shaft 20 but it is fixed against longitudinal movement on said shaft by means of a thrust collar 32 riding in the circumferential groove 33 formed in the transmission shaft 20, the collar 32 being maintained against rotation by means of the keys 34 seating in the grooves between the longitudinally extending splines formed on the shaft 20, as is clearly shown in Figure 5. The thrust collar 32 is also fixed in position by means of the retaining ring 35 secured to the gear 31 by means of the bolts 36 as is clearly shown in Figures 1, 2 and 5.

A gear 37 is formed on the sleeve 26 in spaced relation to the gear 29, this gear being adapted to engage with the shiftable gear 38 mounted on the transmission shaft 20 to effect "first" speed drive.

A gear 39 formed on the sleeve 26 in spaced relation to the gear 37 is adapted to mesh with the idler gear 40 mounted on a stub shaft 41 which gear 40 is adapted to mesh with the sliding gear 38 mounted on the transmission shaft 20 to effect "reverse" drive or backing up of the vehicle.

The gear 38 is provided with a collar portion 42 which is grooved at 43 to receive the shifter fork 44 mounted on a shifter rod 45 suitably connected with a shifting lever 46 adapted to be engaged by the hand of the operator whereby the gear 38 may be moved fore and aft on the transmission shaft 20 to effect first or reverse speeds, by his election, as is the present practice in sliding transmission mechanisms.

The transmission shaft 20 also has splines 51 formed thereon adjacent to its forward end and on which is slidably but non-rotatably mounted the cam member 52, as is clearly shown in Figure 6. Intermediate the splines 51 are longitudinally extending key ways 53, as is clearly shown in Figures 1 and 6, and for a purpose to be presently described. In the embodiment of the invention shown the cam member 52 is provided with three cam faces 54 surrounding which is a ring 55 having its inner face concentric with the axis of rotation of the transmission shaft 20 and eccentric to the cam faces 54 on the cam member 52. Rollers 56 of varying diameters are mounted between the cam member 52 and the ring 55 to provide a clutching means between the respective members when the cam member 52 is rotated in an anti-clockwise direction or in reverse direction to the rotation of the driving shaft 12. The rollers 56 are maintained in clutching position by means of the blocks 57 urged forwardly by means of the springs 58 mounted between the blocks 57 and the radially extending portions of the cam member 52, as is clearly shown in Figure 6.

As stated earlier in the specification, the transmission shaft 20 is provided with key seats 53 in which are mounted rotatable keys referred to generally by the numeral 60. The keys 60 are identical in form and each is provided with flanges 61 extending radially outward at opposite sides of the end faces of the cam member 52, as is shown in Figures 1 and 2.

The keys 60 are also provided with cam faces 62 adjacent to the bottom of the key seats 53, as is shown in Figures 1 and 6. Plungers 63 pressed outwardly by means of the springs 64 engage against the cam faces 62 of the keys 60, tending to rotate the keys 60 in the key seats 53. However, as the outer faces of the keys normally rest against the inner face of the cam member 52, as shown in Figure 6, the keys are prevented from rotation until the ring 55 and cam member 52 are moved longitudinally of the transmission shaft 20, and for the purpose to be hereinafter described.

Assuming that it is desired to move the shifting mechanism from its neutral position, as shown in Figure 1, toward the right or into "third" speed driving position, the ring 55 having internal teeth formed thereon will be moved into engagement with the external teeth on the clutch member 15 mounted on the shaft 12. In moving the ring 55 longitudinally of the transmission shaft 20, the keys 60 will also be moved longitudinally by reason of the engagement of the flanges 61 with the cam member 52 but the cam faces 62 formed thereon are of sufficient length so that the keys 60 will not be rotated during the movement necessary to engage the ring 55 with the clutch member 15. When in this position, it will therefore be seen that driving torque is transmitted by the driving shaft 12 through the clutch member 15 and ring 55 and as the same is caused to rotate in a clockwise direction, the rollers 56 will clutch with the cam member 52 and thereby cause rotation of the transmission shaft 20. It will also be apparent that if the driven or propeller shaft and therefore the transmission shaft is caused to rotate at a speed greater than the driving shaft 12, under the momentum of the former, the rollers 56 will become unclutched which will permit free rotation of the transmission shaft during that condition to thereby permit free wheeling of the vehicle.

If it is desired to move the transmission mechanism to prevent free wheeling, the ring 55, cam member 52 and keys 60 will be moved forwardly of the free wheeling position above described at which time the plungers 63 in the transmission shaft 20 will ride against the cam faces 66 of the keys 60 causing rotation of the same and permitting the faces 67 thereof to engage with the faces of the slots 68 formed in the clutch member 15 to thereby lock the transmission shaft 20 with the driving shaft 12 and to thereby prevent rotation of the transmission shaft relative to the driving shaft. If desired some of the keys 60 can be reversed so that the faces 67 thereof will engage with the opposite sides of the slots 68 in the clutch members 15 or 70 to thereby take the radial thrust in both directions.

In the construction shown, I have shown a mechanism to permit or prevent free wheeling, under the control of the operator, when the transmission mechanism is in either "second" or "third" speed positions. I have therefore shown a clutch member 70 secured on the gear 31 in the same manner as the clutch member 15 is secured on the gear 14 to form a part of the driving shaft 12.

Referring to Figure 2 which shows the sleeve 55 and its associated parts moved to the left or into engagement with the clutch member 70, the keys 60 have rotated to locked position with the clutch member 70 to thereby prevent free wheeling or rotation of the transmission shaft 20 relative to the driving shaft 12. In moving the ring 55 and cam member 52 longitudinally of the transmission shaft 20, it is necessary to provide means to prevent longitudinal movement of the rollers 56 relative to these members. I therefore provide split rings 72 adapted to engage with the thrust rings 73 at either sides of the rollers 56, the split rings 72 being held in position in a groove 74 formed in the ring 55.

The ring 55 is provided with a groove 75 in which is mounted a shifter fork 76 operated by the shift lever 46 upon movement of the latter. The shift lever 46 is provided with a ball 80 carried in the socket 81 formed in the upwardly extending portion 82 of the cover for the transmission casing 10. The portion 82 is provided with inwardly extending lugs 83 forming stops to limit the fore and aft movement of the shifter rod and therefore the longitudinal movement of the ring 55, this movement being sufficient to move the ring 55 and its associated parts fore and aft into free wheeling position.

The shifter lever 46 is provided with a button 85 in the handle thereof, the same being normally pressed outwardly by means of the spring 86. The button 85 is connected by a rod 87 to a stop member 88 formed at the lower end thereof. When it is desired to move the ring 55 and its associated parts to locked position, the operator will press the button 85 downwardly against the compression of the spring 86 which will allow the stop member 88 to be moved beneath the lugs 83 thus permitting the lever 46 to be moved farther whereby the ring 55 and its associated parts can be moved fore and aft to the position in which the keys 60 will rotate into engagement with one of the clutch members 15 or 70 to lock the transmission shaft 20 against rotation relative to the driving shaft.

From the detailed description of the parts given above, my invention should be readily understood and the operation of the mechanism will now be described.

The gear 27 on the sleeve 26 rotatable on the countershaft 25 is driven from the gear 14 on the driving shaft 12 and therefore rotates therewith. Likewise, the gear 29 on the sleeve 26 meshing with the gear 31 rotatable on the transmission shaft 20 rotates the gear 31 therewith. When it is desired to obtain "first" speed the gear 36 splined on the transmission shaft 20 is moved into engagement with the gear 37 on the sleeve 26 so that power is transmitted by the driving shaft 12 through the gear 27, sleeve 26, gear 37, gear 38, transmission shaft 20 to the propeller shaft, not shown.

When it is desired to reverse the direction of travel of the vehicle, the gear 38 is shifted into engagement with the idler gear 40 at which time power is transmitted from the driving shaft 12 through the gear 27, sleeve 26, gear 39, idler gear 40, gear 38, and transmission shaft 20 to the propeller shaft which is thereby caused to rotate in the reverse direction to the rotation of the driving shaft 12.

When it is desired to obtain second speed the sliding gear 38 is moved to neutral position and the ring 55 and its associated parts are moved rearwardly until the ring 55 engages with the clutch member 70 secured to the gear 31. When the mechanism is in this position, power is transmitted by the driving shaft 12 through the gear 14 to the gear 27, sleeve 26, gear 29, gear 31, clutch member 70, ring 55, rollers 56, cam member 52 and the transmission shaft 20 to the propeller shaft. When in this position, if the speed of the vehicle exceeds the speed of the driving shaft, the speed of the cam member 52 will overrun the speed of the ring 55 and the engine will not act as a brake to retard the movement of the vehicle as it will be evident that the rollers 56 positioned between the cam member 52 and ring 55 will permit rotation of the cam member 52 at a speed greater than the engine speed whereby there is not a direct driving connection from the propeller shaft to the engine or driving shaft.

If it is desired to lock the mechanism so that the driving shaft is directly connected with the propeller shaft, the ring 55 is moved longitudinally still farther on the transmission shaft 20 to a position which will cause the plungers 63 in the transmission shaft 20 to ride on the cam faces 66 on the keys 60 to rotate the same into engagement with the faces of the grooves 68 formed in the clutch member 70 to thereby lock the transmission shaft against rotation relative to the engine shaft.

When it is desired to provide "third" speed, the ring 55 and its associated parts are moved forwardly causing the teeth on the ring 55 to engage with the clutch member 15 in which position power is transmitted from the drive shaft 12 through the clutch member 15, ring 55, rollers 56, cam member 52 and transmission shaft 20 to the propeller shaft. Also it will be noted that when the mechanism is in the position just described that the propeller shaft when rotated at a speed in excess of the engine shaft will permit free wheeling, or in other words, the rollers 56 will permit the disengagement or unlocking of the ring 55 relative to the cam member 52 so that there is not a direct driving connection to the engine shaft and the engine will not act as a retarding member. If, however, it is desired to lock the transmission shaft 20 against rotation relative to the driving shaft 12, the ring 55 can be moved forwardly on the transmission shaft 20 to the position in which the plungers 63 will engage with the cam faces 66 on the keys 60 causing the keys 60 to rotate in the key seats 53 and lock the former in the recesses 68 formed in the clutch member 15 in which position the transmission shaft 20 is prevented from rotating at a different speed from the driving shaft.

While I have shown the means to permit or prevent free wheeling of the vehicle, under the control of the operator, as being positioned to provide free wheeling, if desired, in second and third speeds, it will be evident that free wheeling may be provided for second speed only, third speed only, or the mechanism may be positioned to provide for free wheeling in any other speed without material change of construction and without departing from the scope of my invention. Also, while I have shown, for the purpose of illustration, a "three" speed transmission, my invention is not limited to such a construction, as the invention may be used with a transmission having any number of forward and reverse speeds as efficiently as in the construction shown.

Having thus described my invention, it will be apparent that detailed changes can be made in the construction and method of operation without departing from the spirit and substance of the invention and that I desire to claim my invention broadly as well as specifically as indicated in the appended claims.

What I claim is:

1. In a transmission mechanism, the combination of a drive shaft, a driven shaft, means operating to drive said driven shaft in a given direction from said drive shaft and to permit overrun of said driven shaft under the momentum of the latter, and means including a slidable and rotatable key, under the control of the operator, to prevent overrun of said driven shaft relative to said driving shaft.

2. In a transmission mechanism, the combination of a drive shaft, a driven shaft, means operating to drive said driven shaft in a given direction from said drive shaft and to permit overrun of said driven shaft under the momentum of the latter, and means including a key longitudinally and rotatably movable, under the control of the operator, to prevent overrun of said driven shaft relative to said driving shaft.

3. In a transmission mechanism, the combination of a drive shaft, a driven shaft, means associated with said driven shaft operating to drive said driven shaft and permit overrun of the latter under its own momentum, and a key longitudinally movable and rotatable relative to said driven shaft, under the control of the operator, to prevent overrun of said driven shaft relative to said drive shaft.

4. In a transmission mechanism, the combination of a drive shaft, a driven shaft, means associated with said driven shaft operating to drive said driven shaft and permit overrun of the latter under its own momentum, and means including a key longitudinally movable in said driven shaft and rotatable relative thereto, under the control of the operator, to prevent overrun of said driven shaft relative to said drive shaft.

5. In a transmission mechanism, the combination of a drive shaft having a clutch member thereon, a driven shaft, means associated with said driven shaft engageable with said clutch member operating to drive said driven shaft and permit overrun of the latter under its own momentum, and a key slidable in said driven shaft movable under the control of the operator into engagement with said clutch member to prevent overrun of said driven shaft relative to said drive shaft.

6. In a transmission mechanism, the combination of a drive shaft, a driven shaft, a clutch member rotatable relative to said driven shaft, and means associated with said driven shaft including said clutch member operating to drive said driven shaft and permit overrun of the latter under its own momentum, and a key movable axially and then rotatably, under the control of the operator, into engagement with said clutch member to prevent overrun of said driven shaft relative to said drive shaft.

7. In a transmission mechanism, the combination of a drive shaft, a driven shaft, a clutch member rotatable relative to said driven shaft, and means associated with said driven shaft including said clutch member operating to drive said driven shaft and permit overrun of the latter under its own momentum, and a key slidable in said driven shaft and rotatable relative thereto movable into engagement with said clutch member to prevent overrun of said driven shaft relative to said drive shaft.

8. In a transmission mechanism, the combination of a drive shaft having a clutch member thereon, a driven shaft, means associated with said driven shaft engageable with said clutch member operating to drive said driven shaft and permit overrun of the latter under its own momentum, and a key longitudinally and rotatably movable into engagement with said clutch member, under the control of the operator, to prevent overrun of said driven shaft relative to said drive shaft.

9. In a transmission mechanism, the combination of a drive shaft having a clutch member affixed thereon, a driven shaft, a clutch member rotatably mounted on said driven shaft, means associated with said driven shaft shiftable in opposite directions to engage with either of said clutch members to drive said driven shaft and permit overrun of the latter under its own momentum, and a key longitudinally and rotatably movable into engagement with either clutch member, under the control of the operator, to prevent overrun of said driven shaft relative to said drive shaft.

10. In a transmission mechanism, the combination of a drive shaft, a driven shaft, having a key way therein, means associated with said driven shaft operating to drive said driven shaft and permit overrun of the latter under its own momentum, and a key seated in said key way adapted to be moved longitudinally therein by said means, to effect a lock between said drive and driven shafts to prevent overrun of said driven shaft relative to said drive shaft.

11. In a transmission mechanism, the combination of a drive shaft, a driven shaft, means associated with said driven shaft shiftable to drive said driven shaft at the same speed as said driving shaft and shiftable in the opposite direction to drive said driven shaft at a different speed relative thereto and in each position permit overrun of said driven shaft under its own momentum, a key longitudinally movable by said means, and means for rotating said key after initial longitudinal movement thereof in either direction to prevent overrun of said driven shaft relative to said drive shaft.

12. In a transmission mechanism, the combination of a drive shaft, a driven shaft, means associated with said driven shaft and longitudinally movable relative thereto operating to drive said driven shaft and permit overrun of the latter under its own momentum, an operating lever for moving said means longitudinally, and a key movable longitudinally upon initial movement of said operating lever and then rotatable upon extended movement of said operating lever to prevent overrun of said driven shaft relative to said drive shaft.

13. In a transmission mechanism, the combination of a drive shaft, a driven shaft, an operating lever, means associated with said driven shaft movable longitudinally by said operating lever operating to drive said driven shaft and to permit overrun thereof under its own momentum, and a key movable longitudinally by said operating lever, said key permitting overrun of said driven shaft upon initial movement thereof and preventing overrun of said driven shaft relative to said drive shaft upon extended movement thereof.

14. In a transmission mechanism, the combination of a drive shaft, a driven shaft, means associated with said driven shaft operating to drive said driven shaft and permit overrun thereof under its own momentum, a key movable longitudinally by said means, and spring operated means for rotating said key after initial longitudinal movement thereof to prevent overrun of said driven shaft relative to said drive shaft.

CLYDE R. PATON.